April 7, 1970          G. F. QUITTNER          3,505,645

ADJUSTABLE REITERATIVE NETWORK FOR SIGNAL PROCESSING

Filed Sept. 19, 1966          2 Sheets-Sheet 1

INVENTOR
GEORGE F. QUITTNER

BY Richard H. MacCutcheon

ATTORNEY

April 7, 1970          G. F. QUITTNER          3,505,645
ADJUSTABLE REITERATIVE NETWORK FOR SIGNAL PROCESSING
Filed Sept. 19, 1966          2 Sheets-Sheet 2
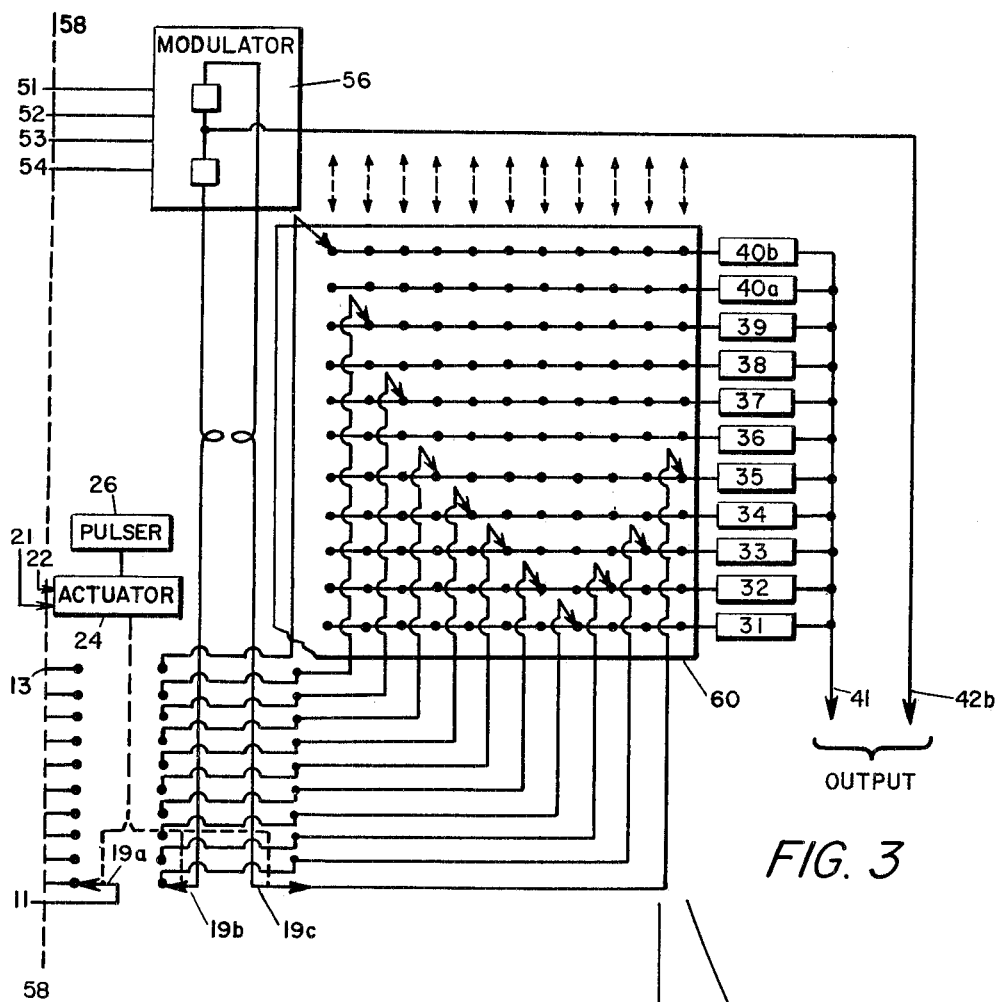
FIG. 3
FIG. 4
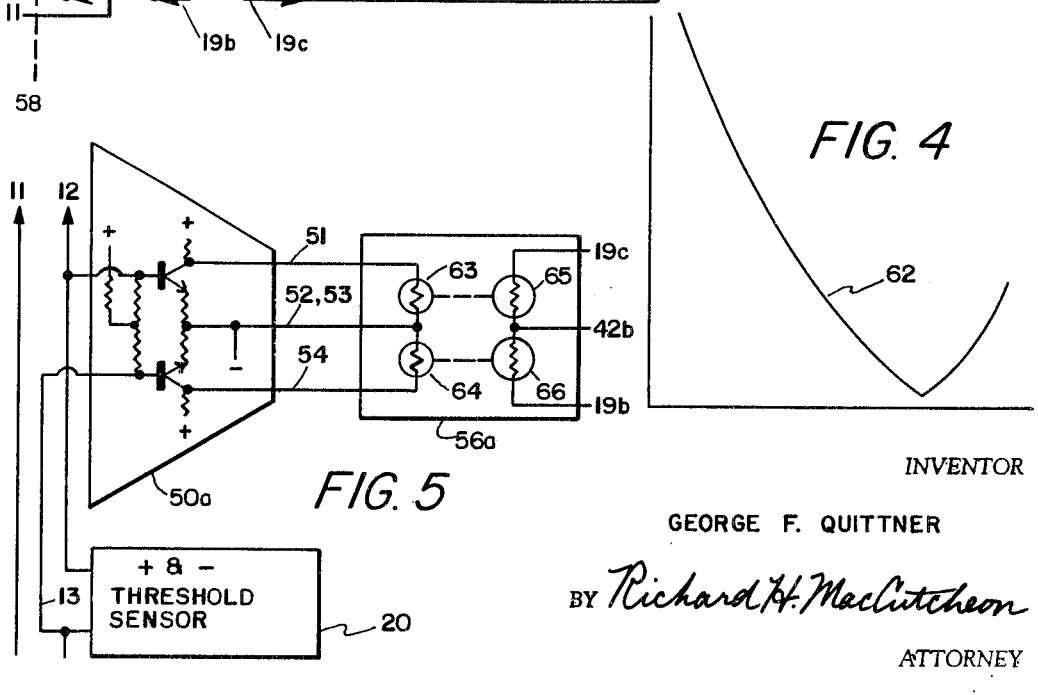
FIG. 5
INVENTOR
GEORGE F. QUITTNER
BY Richard H. MacCutcheon
ATTORNEY

1

3,505,645
ADJUSTABLE REITERATIVE NETWORK FOR
SIGNAL PROCESSING
George F. Quittner, Cleveland Heights, Ohio, assignor to API Instruments Company, Chesterland, Ohio, a corporation of Ohio
Filed Sept. 19, 1966, Ser. No. 580,376
Int. Cl. H04q 1/00
U.S. Cl. 340—172          4 Claims

ABSTRACT OF THE DISCLOSURE

Reiterative electrical signal processing apparatus has a source of input and has a fixed potential supply with potential dividing taps connected through a first circuit in a step switch for sequentially opposing the input with a graduated series of references. The difference, of input minus reference, or vice versa, is taken to a threshold device and, when threshold is exceeded, to an actuator for the step switch. The difference is also taken, as through a difference amplifier, to a modulator. A second circuit of the step switch sequentially switches-in graduated output potential sources to provide an intermediate output which is then modulated in the modulator to provide final output of the defined apparatus.

---

The present invention relates to apparatus for converting an input signal to an output signal having an arbitrarily (e.g., manually) selectable, repeatable relationship to the input signal, and while it is useful in connection with electrical signal processing, the invention is also usable for hydraulic, pneumatic, mechanical or other sorts of signals and their processing.

Particularly in the field of automatic control, there has long been a need for producing an output having an arbitrarily selectable, repeatable relationship to an input. Most commonly the task has been performed by having the input signal rotate a cam, and having a cam follower arm produce an output signal proportional to its radial distance from the cam center. More recent approaches to the problem have used a graph paper on which a curve is drawn, and then by moving either the paper or a line sensor, an output signal is produced proportional to instantaneous position of the drawn line. While such procedures fill specific needs, each has specific limitations as well as capabilities. For example, cam systems are inherently simple and reliable when they are to rotate at constant speed or if the input signal is already in the form of angle of rotation of a shaft, but if the signal is varying, they become relatively complex and less reliable because of the servo drive required, and in any case making new cams to generate new input-output relationships is relatively expensive and time consuming. Further there is a slope limitation inherent in mechanical cam follower systems. Similarly, graph followers, whether the graphed line is followed photoelectrically, resistively, capacitively or by other techniques, are relatively complex and expensive, and subject to errors due to dirt, paper roughness and color, etc.

The most common modern method of performing the same task includes the use of diode-resistor matrices. See, for example, "Electronic Analog and Hybrid Computers," Korn and Korn, McGraw-Bill Book Co., 1964, chapter 6, section 12, pp. 233-240. The two main weaknesses in this approach are (1) adjustments are very time consuming, because all adjustments interact, requiring repeated trial and error tests, and (2) only monotonic relationships (curvatures in one direction) can be achieved without undue complication.

It is an object of the present invention to provide simple

2 and inexpensive means for overcoming the above mentioned difficulties.

Another object is to provide apparatus which is itself relatively reliable and inexpensive, and whereby the changing of an arbitrarily selected reiterative relationship between an input signal and an output is very simple, quick and inexpensive.

In broad aspect, the invention comprises apparatus which automatically categorizes the momentary value of the input signal into one class of a sequence of the like interval classes, and thereby automatically connects to the single output connections the arbitrarily selected one of a group of output signal sources selected to be connected when the input signal falls in that class. In addition, for applications where advantageous, there is provided a modulator which senses instantaneous value of the input signal within the class automatically assigned, and by modulating the output signal between the selected value for that class and the value for the appropriate adjacent class, produces an output signal approaching a continuous, or "smoothed," relationship to the input signal.

Other objects and advantages will become apparent and the invention may be better understood from consideration of the following description taken in connection with the accompanying drawing, in which:

FIG. 3 illustrates a modification;

FIG. 4 is a graphical representation of the (temporary) locus of (up and down movable) connection plugs shown in block 60 of FIG. 3; and FIG. 5 shows a form of modulator as might be useful in connection with the schemes of FIG. 2 and FIG. 3.

Since the electrical, hydraulic, pneumatic and mechanical equivalents of the elements required to practice my invention are well known to those skilled in the art of instrument design and construction, I have not included detailed drawings of any particular form. In describing these elements, however, I will mention some of the commonly used devices.

Figure 1:
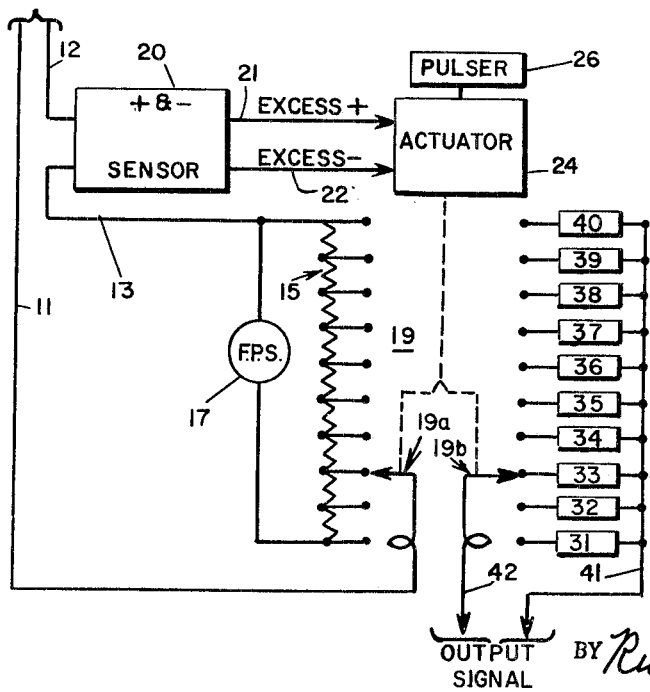
FIG. 1 is a schematic block diagram illustrating basic invention applicable to electrical, pneumatic, hydraulic or mechanical apparatus (or a mixture thereof)

Referring first to FIG. 1 the input signal may be a force, a voltage, a current, a pressure, a rotary or a linear position, and so on. Connections 11, 12, 13 provide a subtractive connection between the input signal and a means 15 connected across a fixed potential source 17 and for providing a plurality of series connected equal potential increments, or classes, or divisions, a step switch 19 being provided so that the connections include a greater or lesser number of these classes to provide an input bucking signal which is subtracted from the input with the difference supplied to a + and − (double) threshold (difference) sensing and signalling means 20. The form of signal entering the threshold sensing device must be suitable to it, so that if the input signal is a voltage, the subtracted input bucking signal may be a voltage, the fixed potential supply may be a voltage and the potential dividing means may be resistors as shown in FIG. 1. A very large number of possibilities exists, according to signal form transformations the designer may find it convenient to use. For example, the input signal might be a shaft position, and a designer might decide to subtract from this another shaft position, so that the threshold sensing device could be as simple as two position-responsive switches ($a+$ and $a-$) or mechanical latches, and in this case the fixed potential supply would simply be a selected length or arc, and the equal divisions might be merely ratchet engaging teeth. On the other hand, if the input signal were a pneumatic pressure, the designer might change it to a position signal by means of a bellows or a bourdon tube, subtracting from it a similar potential in the form of a position. But this is not a limitation, since the input signal, the input bucking signal, and the sensible difference could be in the form of forces, and the + and − threshold sensing and signalling means could then be a spring whose degree of compression or expansion is sensed by electrical contacts, latches, photocells, or the like.

The threshold difference sensing device 20 might be a double (high and low) adjustable set point galvanometer type meter relay, or another sort of device which produces one kind of output when the sensed difference signal exceeds a preset + threshold, or another kind of output when the sensed difference signal is less than a − threshold. These signals, which are preferably arranged to be exclusive, so only one or the other can appear at one time, control through lines 21, 22 (which are, and whose arrows are, intended to show signal lines and signal transfer, rather than actual completed circuit wiring, or piping, or even direction of "flow") a step switch bidirectional actuator 24, with the help of a pulser 26. The pulser serves to break up the output signals from the difference sensing and signalling means 20, so that as long as threshold exceeded condition lasts the actuator will provide continuous stepping. The pulser 26 may be a motor operated, notched, cam operating a ratchet type of step switching actuator 24, or an astable multivibrator operating a one-shot multivibrator actuator 24 operating a train of bistable multivibrators as step switching means 19, or the pulser 26 might be a piston arranged with mechanical valves to oscillate, operating through one or the other of two clutches engaged responsively to the signals from the threshold sensor 20 and driving a rotary multiport valve type of step switching means 19, and so on.

In operation, this portion of my invention behaves like a digital voltmeter; when the difference signal exceeds the + threshold, the actuator 24 steps the switching means 19 continuously until the value of the input signal, with the subtraction of the constantly changing bucking voltage, changes to less than the preset + threshold. As long as the difference signal is between the two threshold values, this (20–24, and 19) portion of the network is inactive. If the input signal drops and the difference signal passes the − threshold, the actuator 24 steps in the other direction until the difference sensor 20 again has no output. Thus the stepper 19 position or state is equivalent to a particular input signal value class. It is obviously advantageous if the gap between thresholds of the difference sensor 20 is adjusted to be very nearly equal to the potential span of the equal interval span of each of the various classes of input bucking signal produced by the equal divisions (at 15) of the fixed potential supply.

The position or state of the plural circuit, plural integral step switching means 19 is determined by the previously described arrangements to represent a class of input signal values. Additional circuits are used (as seen in the drawing figures), to connect a group of output signal sources 31–40 to single output connections 41, 42. This kind of output perhaps distinguishes my invention from prior art digital voltmeters because I have only a single output, the connections for which continuously deliver output signal from an arbitrarily valued group of output signal sources. It will be clear that these output sources may have any sort of relationship to one another, since there is no feedback. For example, as input signal rises from class to class, the output signal may be selected to sequentially rise, or fall or stay constant, or to follow any combination of these in any order.

Although the accompanying figures show the plural circuit, plural integral step switching means 24, 19 as a stepping switch, the number of equivalents available is very great, and I do not intend to be limited to this one variety. Not only may the switching means comprise various kinds of valves, pistons, ratchet rods, mirrors, drums, diaphragms, commutators, magnets, and a whole family of electronic counters, but the plural circuits need not be of the same kinds, so that the input classifying portion 19a of switch 19 might make electrical contacts, while the outputs might be pressures, flows, positions, or forces, and so on, and vice versa.

Figure 2:
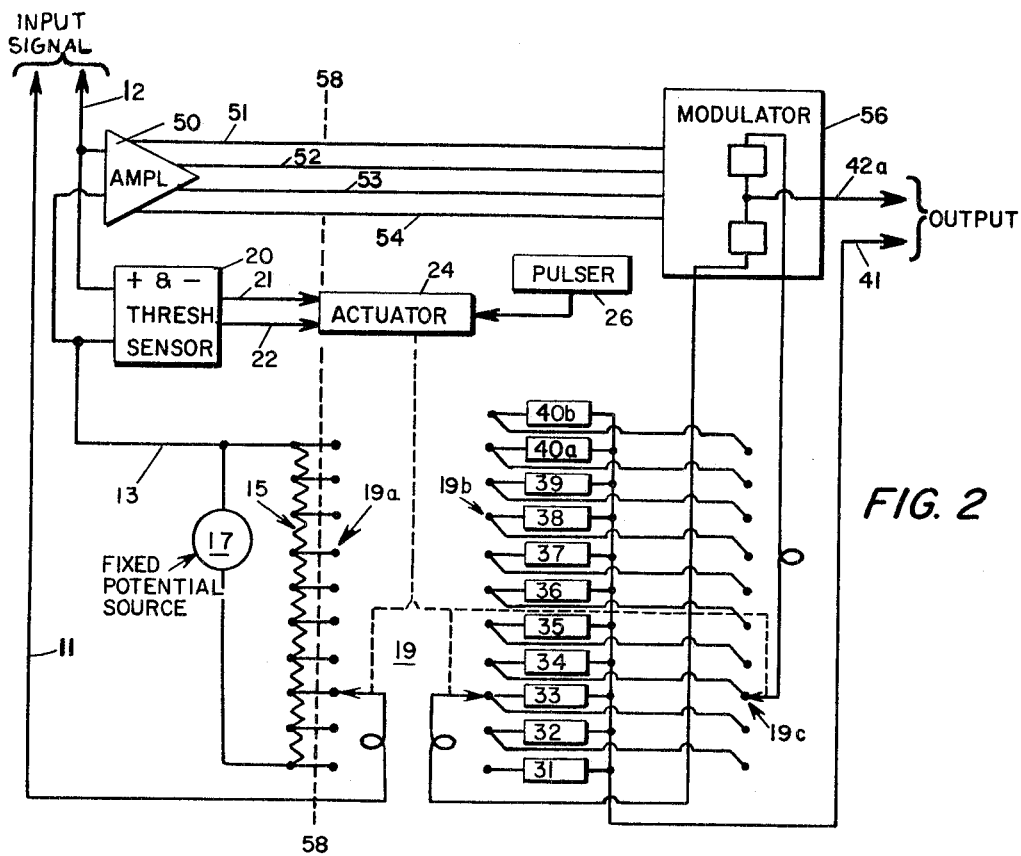
FIG. 2 is a schematic diagram illustrating the addition of the modulator feature.

In FIG. 2 certain elements are added, to fit my invention to a broader range of requirements. Unless all the output sources of FIG. 1 are identical (a seldom useful arrangement), as the input signal varies smoothly from value to value, the output will change in steps. If there are a great many input signal categories the steps may be small enough to satisfy the need for relatively smooth output, but in general this is a comparatively complex and expensive way to achieve smoothed results. FIG. 2 discloses a preferred method.

Except when the input signal is changing from class to class, the step switching means holds in a constant position or state. Most of the time the difference signal is between the thresholds. If the difference signal is near the upper threshold, this is because the input signal is near the maximum value of the class it is in. Because the instantaneous applied difference signal is proportional to output (at ten points) or to the fraction (of the gap between adjacent classes of outputs) at which it would be desirable to have the output signal subsist, in FIG. 2 I show a difference signal amplifier 50 supplying connections 51, 52 (e.g., for signal increases above zero) and 53, 54 (for signal decreases below zero) which operate a modulator 56. By expanding to the step switching means from two circuits (19a and 19b, as in FIG. 1) three (see 19a, 19b and 19c, in FIG. 2), the output can be provided not only from the output step demanded by the input signal class, but also from the next appropriately adjacent class, the modulator 56 being connected in the 19b output circuit and to various output signal sources so as to, at any step, provide a properly proportioned mixture of two output sources. If the output signals are electrical, the modulator might be a tapped resistor, the tap position of which is made proportional to the difference signal by the amplifier 50. If the output signals were flows, the modulator might have two valves adjusted by the amplifier so that as one opens the other closes. If the output were position, the modulator might be a servo motor.

In FIG. 3 I have shown a modification which (in place of the apparatus portion to the right, e.g., of dashed lines 58—58) allows output signal sources to be selected by inexpensive means for varying the input-output relationship with exceptional ease and simplicity, as is particularly helpful in process control applications. As shown within the block 60, a group of manually adjustable selection switching pieces (plugs, handles, levers, or whatever), the group having movable portions equal in number to the number of automatically selectable output signal sources. Instead of the "plural plugs each for vertically arranged plural jacks" switching shown, rheostats, valves, or other equivalents might be used, and have adjusting levers which move in straight lines (or arcuately), and which are preferably arranged so that as they are moved upward the output signals which they provide (at the time of their connection to produce output signal) will be higher valued, so that the arrangement of locus of illustrated plugs or analogous lever tips represents a geographical display of the relationship of output to input signal, if it be assumed that the potential of output source 32 has a higher value than that of source 31, and so on up.

In FIG. 4, where the ordinates represent temporary vertical positioning of the switches within block 60 of FIG. 3, and the abscissae represent, generally, the particular switches, each of which is movable up and down, the graph 62 shows such a relationship for the assumed condition (and for FIG. 3).

FIG. 5 shows an example of a modulator. Like parts are like numbered as before, but the difference amplifier 50a is shown as the type having a push-pull output stage and may be assumed biased to provide some D.C. output to each of two lamps 63, 64 even at "null" (when there is zero input voltage difference applied to the amplifier). In this figure, the modulator 56a comprises the lamps 63, 64 and, respectively arranged to be illumined by them, a pair of conductive type photocells 65, 66.

While a plus and minus threshold sensor has been mentioned as having two thresholds, a plus and minus threshold sensor might have but one threshold which would sense only plus or minus threshold exceeding signal regardless of polarity (e.g., if the threshold sensor is preceded by a full wave rectifier). In this case there would be a two-wire (or one pipe) input as well as output, so far as the sensor is concerned, the stepper would always go in the same direction (whichever way the difference signal went), but, since it would still stop at an appropriate place, the scheme would be workable, and the broader claims hereinafter are intended to cover it.

I claim:

1. A device for converting an input signal to an output having an arbitrarily selectable, repeatable relationship to the input signal, comprising the combination of
   a source of input signal,
   a fixed potential supply,
   potential plural equal division means connected to be energized from said fixed potential supply and for providing a graduated series of potentials,
   plural circuit, plural integral step, switching means, one circuit of which has its plural integral step switching connections interconnected sequentially with sequential potential steps of said potential plural equal division means, thus providing a graduated sequence of reference potentials corresponding each to one of a sequence of switched steps,
   a potential threshold sensing and signalling means,
   connection means for applying to said sensing and signalling means a differece signal representative of the difference between the input signal and the reference potential switched into said one circuit of the step switching means,
   a bidirectional actuator for the switching means, said actuator being interconnected with said threshold sensing and signalling means whereby to step the switching means in one direction or the other,
   a plurality of output potential sources individually connected in a second circuit of the switching means whereby said switching means selects a particular one of said output sources to roughly provide an output for the device corresponding each to a particular input signal class and to one of said graduated series of reference potentials switched by the switching means in its first circuit,
   a difference signal amplifier,
   the connection means for applying a difference signal to the sensing and signalling means also applying difference signal to said difference signal amplifier,
   a modulator means connected to be energized from said difference signal amplifier.

2. The device of claim 1 further characterized by
   a group of manual selecting means equal in number to the number of output signal sources, each of said manual selecting means having connections extending from the output signal sources and having a connection extending to a circuit of the switching means.

3. A device as in claim 1 further characterized by the plural output potential sources having associate means including manually operable pieces—levers, plugs, handles and the like—a different one for adjusting the effective output potential of each such source, said pieces being operatively located substantially co-planar and located in a direction along one coordinate in successive adjacency corresponding to their electrical circuit adjacency in the switching means and located in a direction along another coordinate according to the electrical adjacency of the output potential sources with which they are respectively associated, whereby positioning said pieces for higher or lower output potential compares in general direction with the effect thereof so that the loci of piece positions represents a geographical display of a modulated output potential of the system compared to input potential.

4. A device as in claim 1 further characterized by the step switching means having a third circuit, which circuit is connected to said modulator and is interconnected by successive adjacency with the second circuit of the switching means, whereby output may be provided not only from the output step roughly demanded by the input signal range and as modulated by any difference between input and input reference potential but also from a next appropriately adjacent output step as is useful in order to employ output potential increments of difference which are unequal.

References Cited

UNITED STATES PATENTS

| | | | |
|---|---|---|---|
| 2,981,107 | 4/1961 | Anderson. | |
| 3,012,195 | 12/1961 | Slocomb et al. | 324—99 XR |
| 3,081,431 | 3/1963 | Werner et al. | 324—99 |
| 3,178,695 | 4/1965 | Cadwell | 324—99 XR |
| 3,183,360 | 5/1965 | Van Santen | 328—148 XR |
| 3,327,229 | 6/1967 | Huelsman | 324—99 XR |
| 3,387,275 | 6/1968 | Gooding et al. | 328—138 XR |

DONALD J. YUSKO, Primary Examiner

U.S. Cl. X.R.

324—99